(12) United States Patent
Nelson et al.

(10) Patent No.: US 9,983,044 B2
(45) Date of Patent: May 29, 2018

(54) METHOD FOR DIAGNOSING A TORQUE IMPULSE GENERATOR

(71) Applicant: ATLAS COPCO INDUSTRIAL TECHNIQUE AB, Stockholm (SE)

(72) Inventors: Anders Urban Nelson, Sollentuna (SE); Niclas Mikael Wiklund, Älta (SE)

(73) Assignee: Atlas Copco Industrial Technique AB, Stockholm (SE)

( * ) Notice: Subject to any disclaimer, the term of this patent is extended or adjusted under 35 U.S.C. 154(b) by 140 days.

(21) Appl. No.: 14/897,643

(22) PCT Filed: Jun. 9, 2014

(86) PCT No.: PCT/EP2014/061935
§ 371 (c)(1),
(2) Date: Dec. 10, 2015

(87) PCT Pub. No.: WO2014/198679
PCT Pub. Date: Dec. 18, 2014

(65) Prior Publication Data
US 2016/0195422 A1 Jul. 7, 2016

(30) Foreign Application Priority Data

Jun. 12, 2013 (SE) .................................... 1350716

(51) Int. Cl.
*B25B 21/02* (2006.01)
*B25B 23/14* (2006.01)
(Continued)

(52) U.S. Cl.
CPC ............ *G01F 23/296* (2013.01); *B25B 21/02* (2013.01); *B25B 23/14* (2013.01); *B25B 23/1453* (2013.01); *B25F 5/00* (2013.01)

(58) Field of Classification Search
CPC .......... B25F 5/00; G01F 23/296; B25B 21/02; B25B 23/14; B25B 23/1453;
(Continued)

(56) References Cited

U.S. PATENT DOCUMENTS

| 5,092,410 | A | | 3/1992 | Wallace et al. |
| 5,277,261 | A | * | 1/1994 | Sakoh ..................... B25B 21/02 |
| | | | | 173/109 |

(Continued)

FOREIGN PATENT DOCUMENTS

| EP | 0552990 A1 | 7/1993 |
| EP | 0885693 B1 | 8/2002 |

(Continued)

OTHER PUBLICATIONS

International Search Report (ISR) dated Dec. 18, 2014 issued in International Application No. PCT/EP2014/061935.

*Primary Examiner* — Randy Gibson
*Assistant Examiner* — Gedeon M Kidanu
(74) *Attorney, Agent, or Firm* — Holtz, Holtz & Volek PC

(57) ABSTRACT

A method for diagnosing a torque impulse generator which includes a rotational input portion, a torque output portion, an oil reservoir and a torque generating arrangement converting rotation of the input portion to torque impulses at the torque output portion, the method includes: detecting an acoustic signal from the torque impulse generator while generating torque impulses, extracting the frequency of torque impulses from the acoustic signal, and diagnosing the torque impulse generator based on the frequency of torque impulses, to indicate the level of oil in the oil reservoir.

15 Claims, 3 Drawing Sheets

(51) Int. Cl.
*G01F 23/296* (2006.01)
*B25B 23/145* (2006.01)
*B25F 5/00* (2006.01)

(58) Field of Classification Search
CPC .......... B81C 99/005; G01N 2291/2695; G01N 2291/2697; G01N 29/14; G01N 29/4427
USPC ....................................................... 73/290 V
See application file for complete search history.

(56) References Cited

U.S. PATENT DOCUMENTS

| | | | | |
|---|---|---|---|---|
| 5,289,885 | A * | 3/1994 | Sakoh | B25B 23/1405 173/109 |
| 5,361,852 | A * | 11/1994 | Inoue | B23P 19/066 173/176 |
| 6,110,045 | A | 8/2000 | Schoeps | |
| 6,349,266 | B1 * | 2/2002 | Lysaght | B25B 23/14 702/41 |
| 6,607,041 | B2 * | 8/2003 | Suzuki | B25B 21/02 173/11 |
| 8,549,932 | B1 * | 10/2013 | Schultz | B25B 23/14 73/862.07 |
| 2002/0050364 | A1 * | 5/2002 | Suzuki | B25B 21/02 173/1 |
| 2002/0060082 | A1 * | 5/2002 | Watanabe | B25B 21/02 173/176 |
| 2005/0248303 | A1 * | 11/2005 | Garcia | B23D 59/001 318/480 |
| 2008/0302185 | A1 * | 12/2008 | Yakabe | B81C 99/005 73/587 |
| 2009/0008117 | A1 | 1/2009 | Kettner | |
| 2011/0203822 | A1 * | 8/2011 | Harada | B25B 21/02 173/20 |
| 2013/0056237 | A1 * | 3/2013 | Soderlund | B25B 21/02 173/218 |
| 2013/0167708 | A1 * | 7/2013 | Mkrtchyan | G10H 7/00 84/603 |
| 2014/0278207 | A1 * | 9/2014 | Hadden | G09B 19/0038 702/141 |
| 2015/0144365 | A1 * | 5/2015 | Hirabayashi | B25B 21/02 173/2 |
| 2016/0190965 | A1 * | 6/2016 | Miyazaki | H02P 25/032 318/14 |

FOREIGN PATENT DOCUMENTS

| | | |
|---|---|---|
| EP | 1920888 A1 | 5/2008 |
| WO | 2011141205 A1 | 11/2011 |

* cited by examiner

METHOD FOR DIAGNOSING A TORQUE IMPULSE GENERATOR

The invention relates to a method for diagnosing a torque impulse generator.

BACKGROUND

Pulse tools, i.e. power tools comprising a torque impulse generator, are e.g. used to tighten joints during an assembly operation. Such torque impulse generators comprise a rotational input portion, a torque output portion, an oil reservoir and a torque generating arrangement converting rotation of the input portion to torque impulses at the torque output portion.

In U.S. Pat. No. 5,092,410 A, EP 0885693 B1 and WO 2011141205 A1 various types of torque impulse generators are shown.

The performance of a torque impulse generator is dependent on the level of oil in the oil reservoir. Due to leakage, the level of oil in the oil reservoir tends to decrease over time. When the oil level decreases, the ability of the torque impulse generator to generate torque will decrease. If the operator of the tool is unable to recognize this there is a risk of faulty tightening and destruction of mechanical parts of the torque impulse generator.

Hence, there is a need for a simple way of diagnosing the torque impulse generator and indicating the level of oil in the oil reservoir.

SUMMARY OF THE INVENTION

An object of the invention is to provide a method to meet these needs.

Hence, the invention relates to a method for diagnosing a torque impulse generator, which torque impulse generator comprises a rotational input portion, a torque output portion, an oil reservoir and a torque generating arrangement converting rotation of the input portion to torque impulses at the torque output portion. The method comprises:

detecting an acoustic signal from the torque impulse generator while generating torque impulses, extracting the frequency of torque impulses from the acoustic signal, diagnosing the torque impulse generator based on the frequency of torque impulses, to indicate the level of oil in the oil reservoir.

The level of oil in the oil reservoir will influence the ability of the torque impulse generator to generate torque. If the level of oil decreases, less rotational energy of the input portion will be converted to torque impulses at the torque output portion. This will thus increase the relative rotation frequency between the rotational input portion and the torque output portion, and thus increase the frequency of torque impulses. By detecting an acoustic signal from the torque impulse generator, extracting the frequency of torque impulses from the acoustic signal and diagnosing the torque impulse generator based on the frequency of torque impulses, the level of oil in the oil reservoir of the torque impulse generator may be indicated. The method allows for simple and efficient diagnosis of torque impulse generators, which may be used at the point of operation of the torque impulse generators, e.g. at an assembly station.

The acoustic signal may be detected via air transmission. Thus the method may be used to contact-less diagnosing the torque impulse generator and indicating the level of oil in the oil reservoir.

The acoustic signal may alternatively be detected via a transmission through one or more pieces of material. Thus the acoustic signal may be picked up e.g. via mechanical contact with the tool carrying the torque impulse generator, or via mechanical contact with a workpiece at which a fastener is tightened.

The step of diagnosing the torque impulse generator may comprise comparing the frequency of impulses of the torque impulse generator with a predetermined normal frequency of impulses of the torque impulse generator. Thus a deviation from the normal frequency of impulses may be detected and indicated.

The method may first comprise identifying the type of torque impulse generator to determine the normal frequency of impulses of the torque impulse generator. Thus the method may be fit to different types of torque impulse generators by determining their respective normal frequency of impulses.

The normal frequency of impulses of the torque impulse generator may be within the range of 5-50 Hz, preferably within the range of 8-38 Hz, more preferably within the range of 15-25 Hz. The normal frequency of impulses of the torque impulse generator may depend on the type of torque impulse generator.

The normal frequency of impulses may be dependent on one or more operational parameters of the torque impulse generator. Thus the normal frequency of impulses used may be set dependent on an input of one or more operational parameters (e.g. maximum torque of a motor driving the torque impulse generator, or the air pressure driving an air motor connected to the torque impulse generator).

The method may comprise the step of indicating that the oil reservoir needs to be refilled if the frequency of impulses of the torque impulse generator is above a predetermined threshold in relation to the predetermined normal frequency of impulses of the torque impulse generator.

The method may comprise the step of indicating that the amount of oil in the oil reservoir should be reduced, if the frequency of impulses of the torque impulse generator is below a predetermined threshold in relation to the predetermined normal frequency of impulses of the torque impulse generator.

The predetermined threshold may be 0.5-5 Hz from the predetermined normal frequency of impulses of the torque impulse generator, preferably 1-2 Hz from the predetermined normal frequency of impulses of the torque impulse generator.

The torque output may be generated at predetermined operational conditions of the torque impulse generator. Thus the influence of operational conditions on the torque impulse frequency may be minimised.

The predetermined conditions may e.g. comprise generating the torque output against a certain resistance to rotation. The torque output portion may e.g. be firmly attached to a vice, or the torque output may be generated during tightening of a defined fastener of a joint.

The predetermined conditions may comprise generating the torque output at a predetermined range of rotational speed of the rotational input portion.

The torque impulse generator may be connected to an air motor driven by compressed air, and wherein the predetermined conditions may comprise generating the torque output at a predetermined air pressure supplied to the air motor (i.e. generating a predetermined maximum torque)

The torque impulse generator may be connected to an electric motor, and wherein the predetermined conditions may comprise properties or condition of the electric motor and/or battery.

The torque impulse generator may be comprised by a power tool for fastening joints. The power tool may be an air-driven power tool or an electrically driven power tool.

One or more of the steps of the method may be performed by a handheld electronic device. The handheld electronic device may e.g. be a phone such as a smartphone. Thus the method is easily accessible by operators of power tools and other personnel.

The invention further relates to a hand held electronic device configured to perform the method as disclosed herein.

The invention further relates to a computer program product comprising code means, which when executed by a processing unit performs the method as disclosed herein.

The invention further relates to an application ("app") to be installed in a smartphone, the app comprising code means, which when executed by a processing unit in the smartphone performs the method as disclosed herein.

Other features and advantages of the invention will be apparent from the figures and from the detailed description of the shown embodiment.

SHORT DESCRIPTION OF THE DRAWINGS

In the following detailed description reference is made to the accompanying drawings, of which:

DETAILED DESCRIPTION OF THE SHOWN EMBODIMENT OF THE INVENTION

Figure 1:
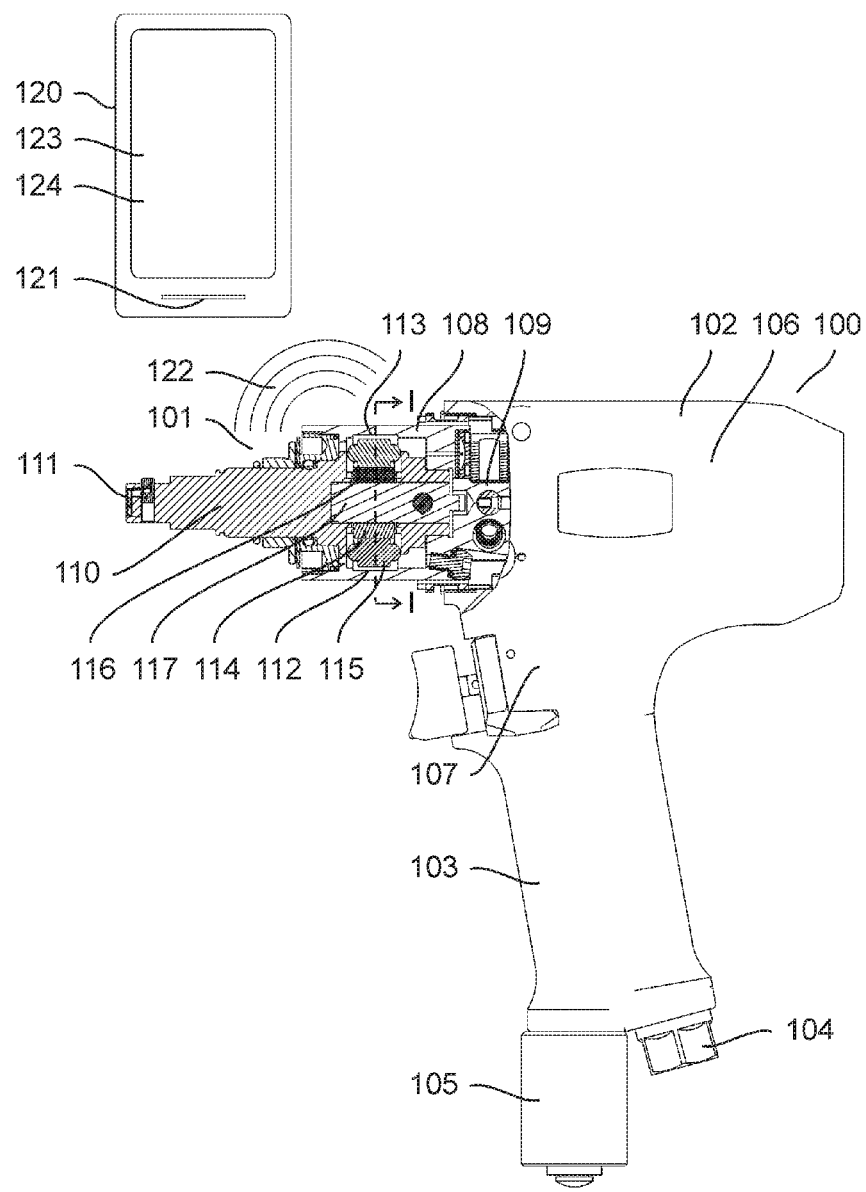
FIG. 1 shows a power tool having a torque impulse generator, together with a hand held electronic device configured to perform the method as disclosed.

FIG. 1 shows a power tool 100 comprising a torque impulse generator 101. The power tool further comprises a housing 102 having a handle 103, an air supply 104 and an air exhaust 105. The air supply is connected to an air motor 106 (not shown) via a throttle valve 107. The torque impulse generator comprises a rotational input portion 108 comprising a shaft 109 connected to the air motor, and a torque output portion 110 having an output shaft for supporting a tool bit or a quick tool change chuck. The torque impulse generator further comprises a torque generating arrangement 112 converting rotation of the input portion to torque impulses at the torque output portion. The torque generating arrangement 112 comprises a cam 113 formed on the inside of the rotational input portion 108, and a pair of cam followers in the form of a pair of pistons 114 and rollers 115. The space formed radially inside the pistons, and the space formed radially inside the rotational input portion 108 and surrounding the pistons and rollers forms an oil reservoir 116. Radially inside the pistons there is a cam spindle 117.

As an alternative, the cam followers may be provided as a set of vanes, as described in relation to FIGS. 4 and 5 of EP 0885693 B1.

In the vicinity of the power tool, a hand held electronic device 120 in the form of a smartphone is shown. The hand held electronic device comprises a microphone 121 for detecting acoustic signals 122 from the torque impulse generator and a display 123 for displaying diagnostic results to an operator. The device further comprises input means 124 to allow interaction with the operator, e.g. in the form of touch functionality of the display.

Figure 2A:
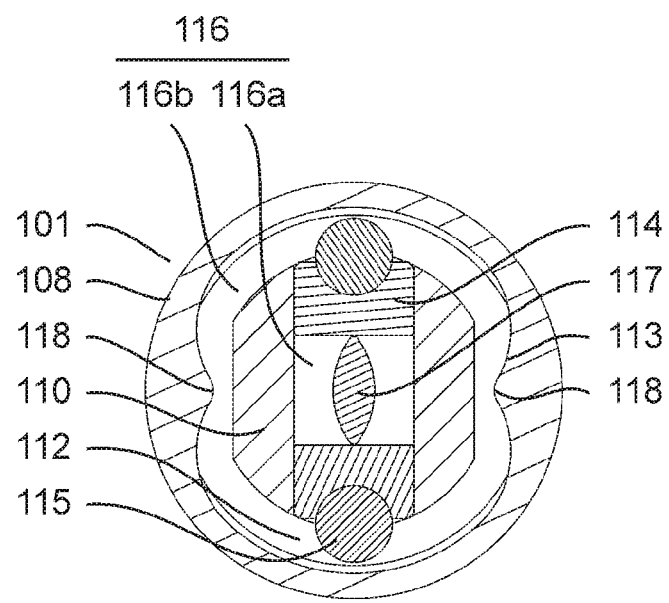
FIGS. 2a and 2b show a torque impulse generator in a cross-sectional view in two rotational positions.
Figure 2B:
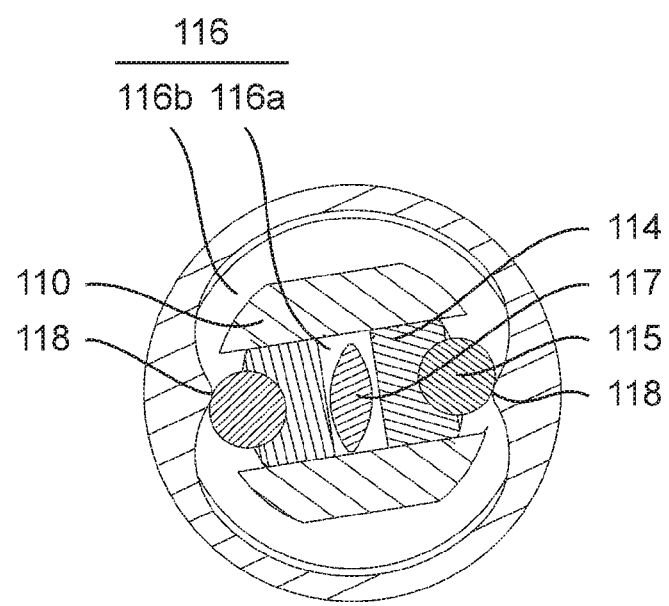

With reference to FIGS. 2a and 2b, a cross-sectional view of the torque impulse generator along I-I in FIG. 1 is shown in two positions shown as FIG. 2a and FIG. 2b respectively. Again, the torque impulse generator 101 comprises a rotational input portion 108, and a torque output portion 110. The torque impulse generator further comprises a torque generating arrangement 112 converting rotation of the input portion to torque impulses at the torque output portion. The torque generating arrangement 112 comprises a cam 113 formed on the inside of the rotational input portion 108. The cam comprises two cam lobes formed as ridges. A pair of cam followers in the form of a pair of pistons 114 and rollers 115 is supported in the torque output portion 110. The space 116a formed radially inside the pistons, and the space 116b formed radially inside the rotational input portion 108 and surrounding the pistons and rollers forms an oil reservoir 116. Radially inside the pistons there is a cam spindle 117 having a lens-shaped cross-section connected to the rotational input portion 108 and arranged to force the pistons towards the cam in the rotational position in FIG. 2a.

In FIG. 2b, the torque impulse generator is shown in a second rotational position, where the rotational input portion 108 has been rotated relative to the torque output portion 110 such that the rollers 115 are brought into contact with the cam lobes 118 of the cam, whereby the rollers and pistons 114 are forced radially inwards. Oil in the space 116a is then forced through passages formed between the pistons 114 and the torque output portion 110 and out to the space 116b formed radially inside the rotational input portion 108 and surrounding the pistons and rollers. Due to the relative incompressibility of the oil in the oil reservoir 116 formed by the spaces 116a and 116b, torque is then transmitted from the rotational input portion 108 to the torque output portion 110.

Similarly, when the rotational input portion 108 has been rotated relative to the torque output portion 110 such that the rollers 115 have passed the cam lobes 118 of the cam, the cam spindle 117 (rotating with the rotational input portion 108) force the pistons 114 radially outwardly towards the cam. Oil in the space 116b is then forced through the passages formed between the pistons 114 and the torque output portion 110 and in to the space 116a, whereby torque is transmitted from the rotational input portion 108 to the torque output portion 110.

The combined action of the above generates a torque impulse at the torque output portion 110, which impulse may be used to tighten a fastener such as a screw fastener.

If the level of oil in the oil reservoir 116 is too low, e.g. as a result of oil leakage, the oil in the oil reservoir will contain a larger amount of air. Since air is compressible, the oil/air mixture in the respective spaces 116a and 116b may be compressed and allow a certain movement of the pistons 114 and rollers 115 without any transport of oil between the spaces. The transfer of torque from the rotational input portion 108 to the torque output portion 110 will therefore be less effective. This will also result in that the frequency of torque impulses will increase, since the resistance to relative rotation between the rotational input portion 108 and the torque output portion 110 will decrease.

Similarly, if the level of oil in the oil reservoir 116 is too high, e.g. as a result of over filling, the frequency of torque impulses will decrease, since the resistance to relative rotation between the rotational input portion 108 and the torque output portion 110 will increase.

This the performance of the torque impulse generator is sensitive to variations in the level of oil in the oil reservoir.

Figure 3:
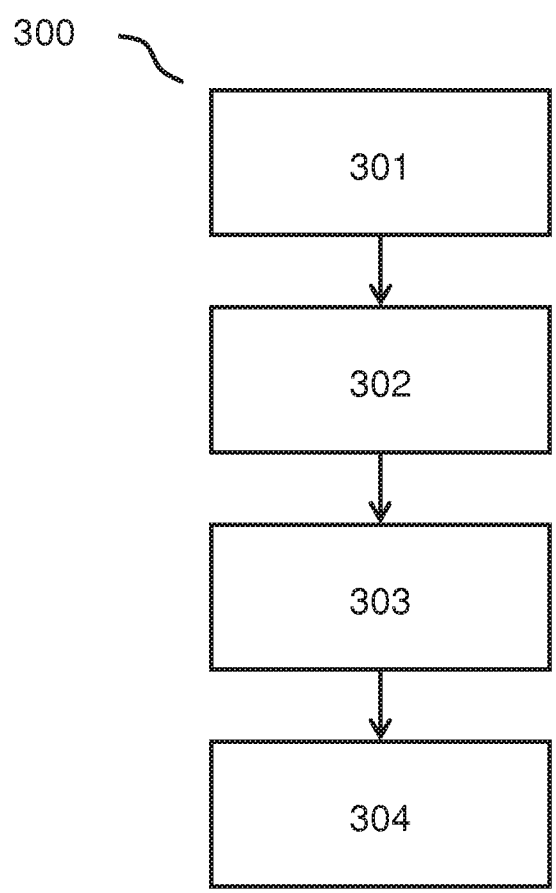
FIG. 3 shows a flow chart of a method for diagnosing a torque impulse generator.

With reference to FIG. 3, a flow chart of a method 300 for diagnosing a torque impulse generator is shown.

Depending on the type of torque impulse generator, a normal frequency of impulses is determined or set. The normal frequency of impulses depends on the size, design and construction of the torque impulse generator. The normal frequency is within the range of 5-50 Hz, preferably 8-38 Hz, more preferably within the range of 15-25 Hz.

The torque impulse generator is operated to generate torque impulses under predetermined operational parameters. As one example this includes operating the torque impulse generator against a rigid connector, e.g. clamped in a vice.

A hand held electronic device is provided to detect 301 an acoustic signal from the torque impulse generator while generating torque impulses. The acoustic signal may e.g. be stored in the electronic device for processing, or processing of the acoustic signal may be done on the fly.

From the acoustic signal, a frequency of torque impulses is extracted 302. This may be done e.g. by FFT (Fast Fourier Transform) and determining a peak in the spectrum in the range of 5-50 Hz, or 10-30 Hz.

The frequency of impulses of the torque impulse generator is thereafter compared 303 with the normal frequency of impulses of the torque impulse generator. From this comparison, the torque impulse generator is diagnosed 304 indicate the level of oil in the oil reservoir.

If the frequency of impulses of the torque impulse generator is above a predetermined threshold in relation to the predetermined normal frequency of impulses of the torque impulse generator, it is indicated that the oil reservoir needs to be refilled.

If the frequency of impulses of the torque impulse generator is below a predetermined threshold in relation to the predetermined normal frequency of impulses of the torque impulse generator, it is indicated that the oil in the oil reservoir should be reduced.

The predetermined threshold may be within 0.5-5 Hz, or 1-2 Hz, from the predetermined normal frequency of impulses of the torque impulse generator from the predetermined normal frequency of impulses.

The method may be implemented in the hand held electronic device 120 shown in FIG. 1.

The method may be implemented by a computer program, having code means, which when run in a processing unit causes the processing unit to execute the steps of the method. The computer program may be comprised in a computer readable medium of a computer program product. The computer readable medium may consist of essentially any memory, such as a ROM (Read-Only Memory), a PROM (Programmable Read-Only Memory) an EPROM (Erasable PROM), a Flash memory, an EEPROM (Electrically Erasable PROM), or a hard disk drive. The computer program may be adapted to be executed by a hand held electronic device 120 as shown in FIG. 1

As is obvious for a skilled person, a number of other implementations, modifications, variations and/or additions can be made to the above described exemplary embodiments. It is to be understood that the invention includes all such other implementations, modifications, variations and/or additions which fall within the scope of the claims.

The invention claimed is:

1. A method for diagnosing a torque impulse generator, wherein the torque impulse generator comprises a rotational input portion, a torque output portion, an oil reservoir, and a torque generating arrangement which converts rotation of the input portion to torque impulses at the torque output portion, the method comprising:
   determining or setting a normal frequency of torque impulses of the torque impulse generator;
   positioning a handheld electronic device comprising a microphone proximate to the torque impulse generator;
   operating the torque impulse generator to generate torque impulses under predetermined operational parameters;
   detecting, by the microphone of the handheld electronic device, an acoustic signal from the torque impulse generator while generating the torque impulses;
   extracting a frequency of torque impulses from the acoustic signal;
   comparing the extracted frequency to the normal frequency; and
   diagnosing the torque impulse generator based on a result of the comparing, to indicate a level of oil in the oil reservoir,
   wherein the extracting, the comparing, and the diagnosing are performed by the handheld electronic device.

2. The method according to claim 1, further comprising first identifying a type of the torque impulse generator to determine the normal frequency of torque impulses of the torque impulse generator.

3. The method according to claim 1, wherein the normal frequency of torque impulses of the torque impulse generator is within a range of 5-50 Hz.

4. The method according to claim 1, further comprising indicating that the oil in the oil reservoir should be reduced, if the extracted frequency is below a predetermined threshold in relation to the normal frequency of torque impulses of the torque impulse generator.

5. The method according to claim 1, wherein operating the torque impulse generator to generate torque impulses under the predetermined operational parameters comprises generating torque output against a certain resistance to rotation.

6. The method according to claim 1, wherein operating the torque impulse generator to generate torque impulses under the predetermined operational parameters comprises generating torque output at a predetermined range of rotational speed of the rotational input portion.

7. The method according to claim 1, wherein the torque impulse generator is comprised by a power tool for fastening joints.

8. The method according to claim 3, wherein the normal frequency of torque impulses of the torque impulse generator is within a range of 8-38 Hz.

9. The method according to claim 8, wherein the normal frequency of torque impulses of the torque impulse generator is within a range of 15-25 Hz.

10. The method according to claim 1, further comprising indicating that the oil reservoir needs to be refilled, if the extracted frequency is above a predetermined threshold in relation to the normal frequency of torque impulses of the torque impulse generator.

11. The method according to claim 10, wherein the predetermined threshold is 0.5-5 Hz from the normal frequency of torque impulses of the torque impulse generator.

12. The method according to claim 11, wherein the predetermined threshold is 1-2 Hz from the normal frequency of torque impulses of the torque impulse generator.

13. A non-transitory computer-readable medium having a program stored thereon that is executable by a computer of a handheld electronic device comprising a microphone to perform a process for diagnosing a torque impulse generator, the torque impulse generator comprising a rotational input portion, a torque output portion, an oil reservoir, and a torque generating arrangement which converts rotation of the input portion to torque impulses at the torque output portion, and the process comprising:
- determining or setting a normal frequency of torque impulses of the torque impulse generator;
- detecting, by the microphone of the handheld electronic device while the handheld electronic device is positioned proximate to the torque impulse generator, an acoustic signal from the torque impulse generator while the torque impulse generator is operated to generate torque impulses under predetermined operational parameters;
- extracting a frequency of torque impulses from the acoustic signal;
- comparing the extracted frequency to the normal frequency; and
- diagnosing the torque impulse generator based on a result of the comparing, to indicate a level of oil in the oil reservoir.

14. The non-transitory computer-readable medium according to claim 13, wherein the handheld electronic device is a smartphone, and the program is an application to be installed in the smartphone.

15. A method for diagnosing a torque impulse generator, wherein the torque impulse generator comprises a rotational input portion, a torque output portion, an oil reservoir, and a torque generating arrangement which converts rotation of the input portion to torque impulses at the torque output portion, the method comprising:
- determining or setting a normal frequency of torque impulses of the torque impulse generator;
- detecting, by a microphone of a handheld electronic device while the handheld electronic device is positioned proximate to the torque impulse generator, an acoustic signal from the torque impulse generator while the torque impulse generator is operated to generate torque impulses under predetermined operational parameters;
- extracting a frequency of torque impulses from the acoustic signal;
- comparing the extracted frequency to the normal frequency; and
- diagnosing the torque impulse generator based on a result of the comparing, to indicate a level of oil in the oil reservoir,
- wherein the extracting, the comparing, and the diagnosing are performed by the handheld electronic device.

* * * * *